Feb. 8, 1944.   H. E. GANTZER   2,341,373
SORTING MACHINE
Filed Oct. 8, 1941   3 Sheets-Sheet 1
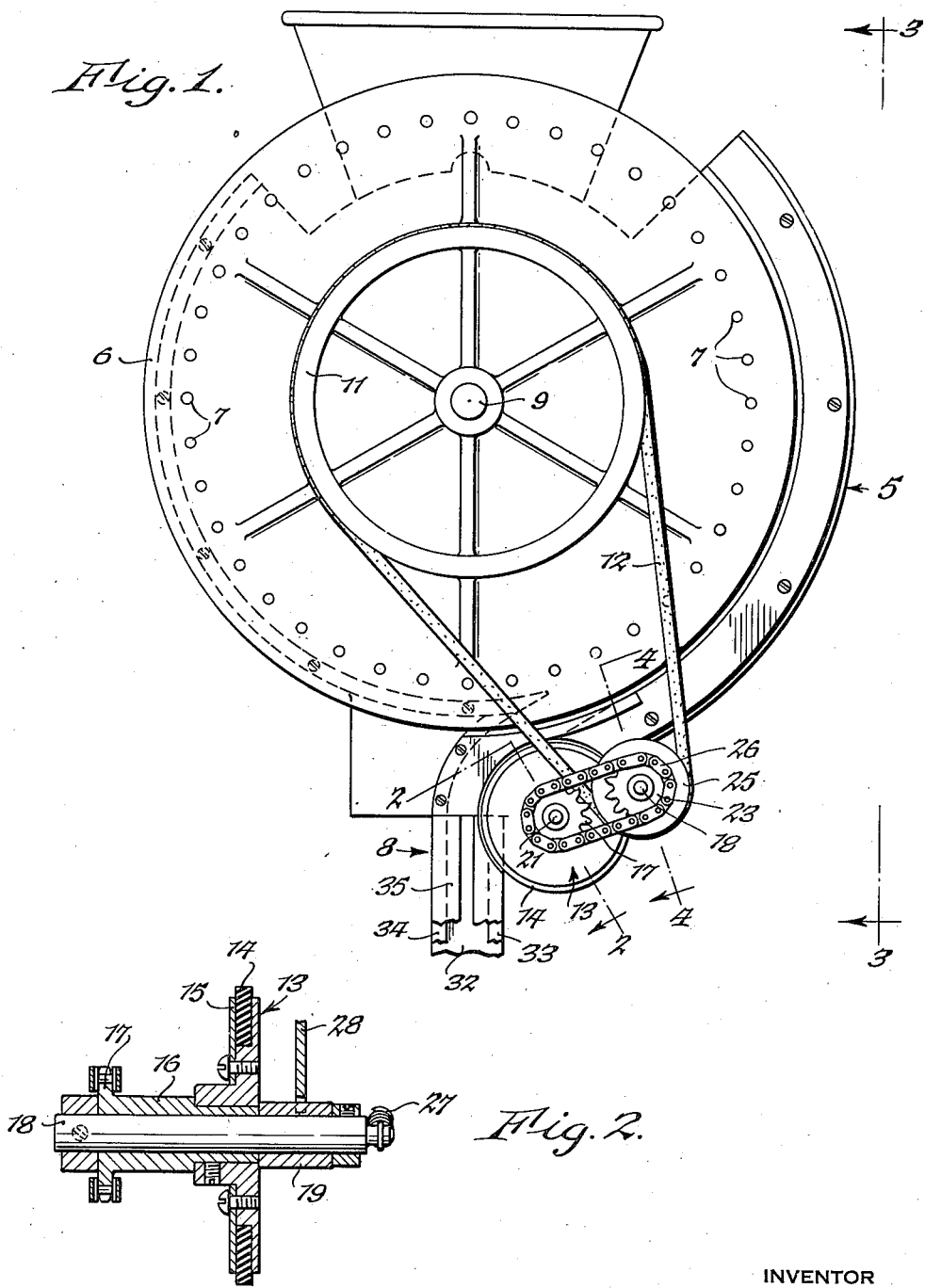
INVENTOR
Howard E. Gantzer
BY
James D. Bock
ATTORNEY

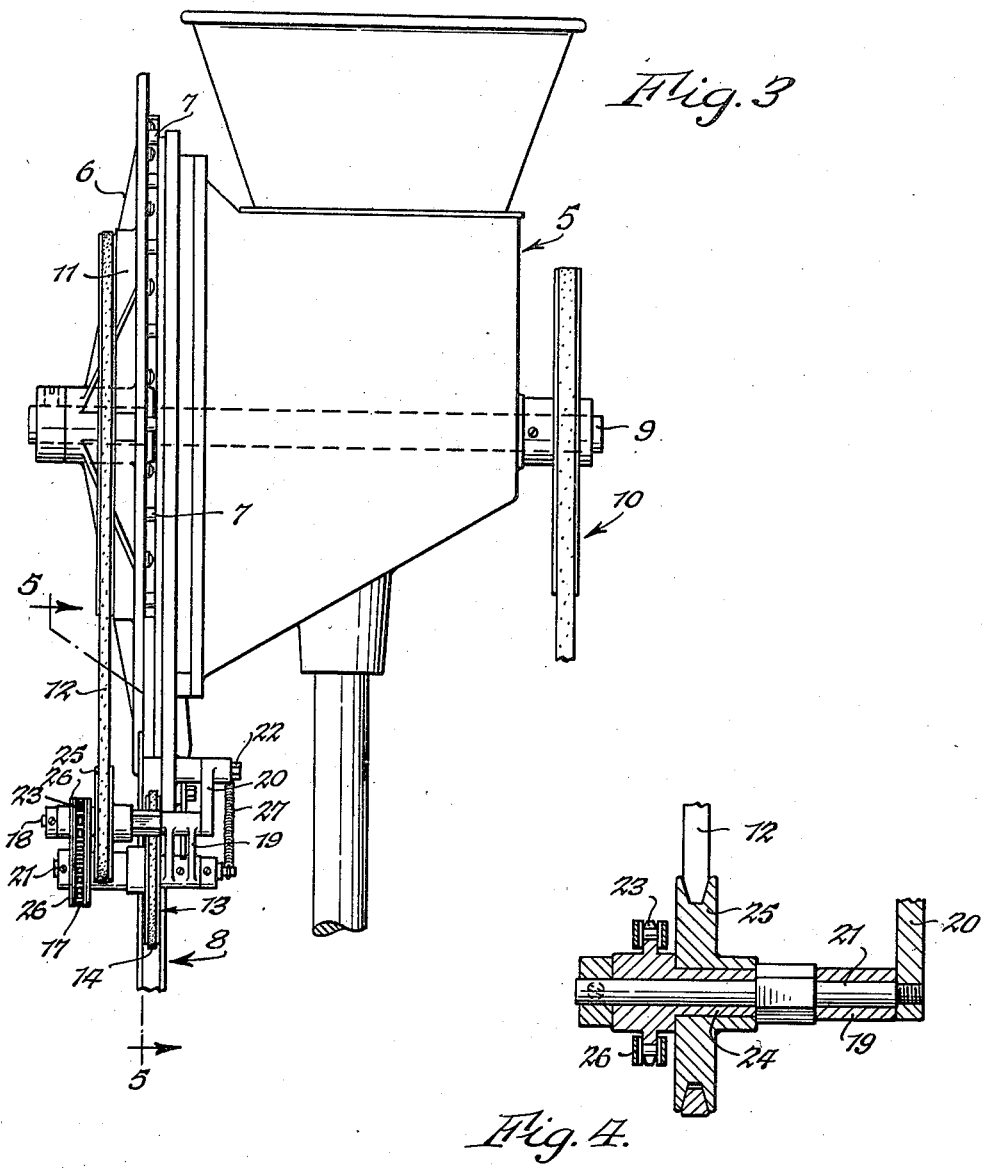

Feb. 8, 1944. H. E. GANTZER 2,341,373
SORTING MACHINE
Filed Oct. 8, 1941   3 Sheets-Sheet 3
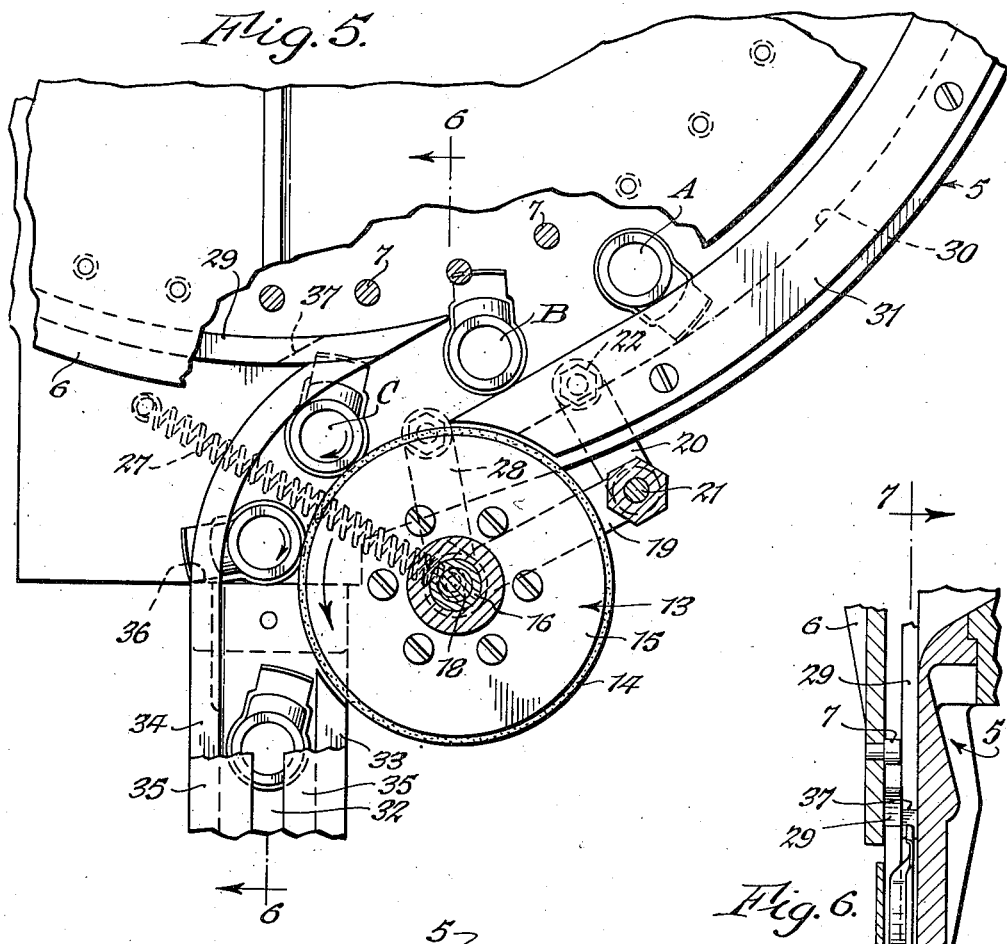
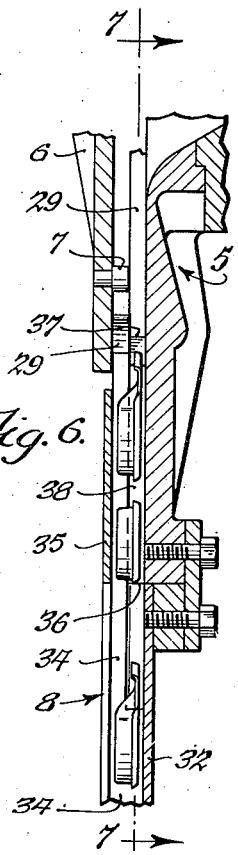
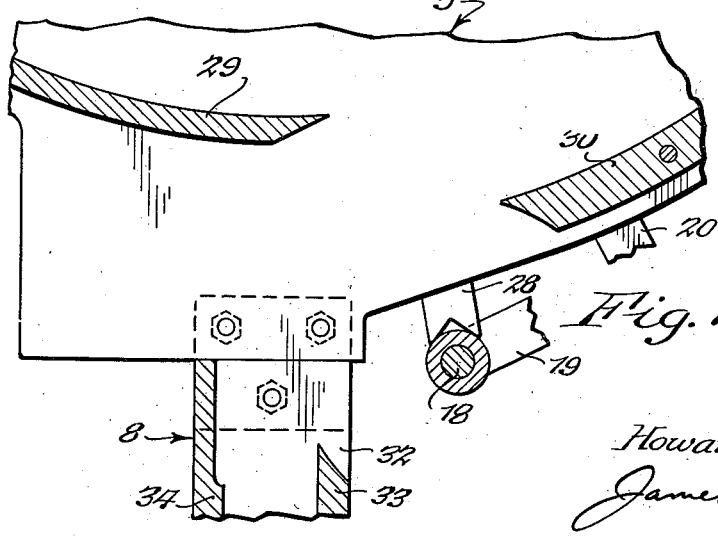
INVENTOR
Howard E. Gantzer
BY
James D. Bock
ATTORNEY Patented Feb. 8, 1944

2,341,373

UNITED STATES PATENT OFFICE 2,341,373

SORTING MACHINE

Howard E. Gantzer, Kenmore, N. Y., assignor to Consolidated Packaging Machinery Corporation, a corporation of New York Application October 8, 1941, Serial No. 414,045

6 Claims. (Cl. 193—43)

This invention relates to new and useful improvements in article selecting and feeding mechanisms and particularly seeks to provide novel mechanisms adapted to effect the proper sorting of irregularly shaped articles such as pouring spouts for containers.

Many machines of this general nature have been heretofore employed to select, orient and feed container closures in a uniform manner so that the assorted closures could be thereafter handled by suitable closure applying devices without further manipulation. An example of such known machines may be found in U. S. Letters Patent 2,073,472 granted to Howard E. Gantzer on March 9, 1937. Such machines, however, are only adapted to operate upon container closures or other objects of generally circular cross section.

It is an object of this invention to provide a novel sorting machine which is adapted to sort and supply a series of uniformly arranged irregularly shaped articles to an associated article handling or applying machine.

Another object of this invention is to provide a machine of the character stated which includes an article receiving hopper, a pin studded sorting wheel associated with the hopper, and discharge means associated with the sorting wheel for receiving the irregularly shaped articles from the sorting wheel and discharging the same in properly oriented positions.

Another object of this invention is to provide a machine of the character stated in which the discharge means includes an object receiving chute having one side wall portion relieved to permit reception of projecting portions of the sorted articles preparatory to orienting the same during discharge thereof from the machine.

Another object of this invention is to provide a machine of the character stated in which the discharge chute is provided with an article orienting and ejecting wheel disposed in opposition to the relieved side wall portion of the discharge chute and being effective to impart rotary movement to articles being discharged from the machine as an incident to the proper orientation thereof during discharge.

Another object of this invention is to provide a machine of the character stated which is simple in design, rugged in construction, and economical to manufacture.

With these and other objects in view, the nature of which will become more apparent, the invention will be more fully understood by reference to the drawings, the accompanying detailed description, and the appended claims.

In the drawings:

Fig. 1 is a somewhat fragmentary front elevation of a sorting machine constructed in accordance with this invention;

Fig. 2 is a detail section taken along line 2—2 of Fig. 1;

Fig. 3 is a side elevation of the mechanism shown in Fig. 1 and taken along line 3—3 thereof;

Fig. 4 is a detail section taken along line 4—4 of Fig. 1;

Fig. 5 is an enlarged sectional view taken along line 5—5 of Fig. 3;

Fig. 6 is a detail sectional view taken along line 6—6 of Fig. 5; and

Fig. 7 is a fragmentary detail section taken along line 7—7 of Fig. 6.

Referring to the drawings in detail, the invention as illustrated, is embodied in a sorting machine including a supply hopper 5, a sorting wheel 6 provided with a plurality of sorting pins or studs 7, and a discharge chute generally indicated at 8. The sorting wheel is mounted on a horizontal shaft 9 and is driven from a suitable source of power (not shown) through a belt and pulley connection generally indicated at 10. The outer face of the sorting wheel 6 is provided with an axial projection 11 having a circumferential groove adapted to receive a belt 12 for driving article orienting mechanism as will be hereinafter more fully described.

The article orienting mechanism is positioned adjacent to and in cooperative relation with the discharge chute 8 and is effective to adapt the machine to the sorting of articles such as pouring spouts for containers which include a cap-like body portion and a radially extending lip portion. In positioning the pouring spouts for engagement by the automatic spout applying devices of an associated machine, it will be apparent that it is necessary for the radially extending lip portions of the spouts to be disposed in the same direction. To this end, a wheel 13 having a rubber annulus 14 secured thereto by a clamping disk 15 is disposed in overlapping relation with respect to the curved upper end of the discharge chute. The wheel 13 is affixed to the hub 16 of a sprocket gear 17 rotatably carried by a shaft 18. The shaft 18 is secured to one end of a link 19, the other end of which is pivotally connected to the lower end of an arm 20 through the medium of a shaft 21. The upper end of the arm 20 is pivotally connected to the hopper 5 as by a bolt 22. A sprocket gear 23 having a hub 24 is rotatably carried by the shaft 21. A pulley 25 is affixed to the hub 24 of the sprocket gear and is operatively connected to the sorting wheel 6 through the belt 12. Thus, the sprocket gear 23 is driven from the sorting wheel and in turn drives the wheel 13 through the medium of a sprocket chain 26 and the sprocket gear 17 carried by the shaft 18. A tension spring 27 extends between one end of the shaft 18 and the hopper 5 and, consequently, urges the shaft and its associated wheel 13 towards the discharge chute 8. A depending arm 28 has its upper end secured to the hopper and its lower end disposed adjacent that end of the link 19 which carries the shaft 18. The lower end of the arm 28 is notched to receive the end of the link 19 and thus serves to limit the movement of the shaft 18 and its associated wheel 13 towards the discharge chute. It should be noted that the diameter of the wheel 13 is such that its periphery is substantially concentric with the curved portion of the discharge chute 8 and that the normal position of the wheel is such that the distance between the periphery of the wheel and the opposite side of the discharge chute is slightly less than the diameter of the body portion of the articles being assorted.

The hopper 5 is provided over one quadrant of its end rim with an annular segment 29 which serves to confine the pouring spouts within the chamber defined by the sorting wheel and hopper. Another annular segment 30 is secured to the opposed quadrant of the hopper end and serves the same purpose as the segment 29. The segment 30 is covered by a somewhat wider plate 31 which together with the adjacent portion of the hopper defines an internal circumferential groove adapted to receive and permit passage of the lip portions of sorted pouring spouts (see Fig. 5). The segment 30 and the cover plate 31 terminate at the wheel 13 and have their end portions contoured to conform to the curvature of the wheel.

The discharge chute 8 includes a back plate 32, a side wall member 33 adjacent the wheel 13, an opposite side wall member 34 which joins the associated end of the segment 29, and a slotted front or cover plate 35. The under face of the upper end of the side wall member 34 is cut away from a point indicated at 36 to the point indicated at 37 (see Fig. 5) to thereby provide a slot 38 (see Fig. 6) adapted to receive and permit passage of the lip portions of the pouring spouts during orientation thereof while being discharged.

In operation, the pouring spouts are dumped into the hopper in the usual manner and the sorting wheel is rotated to effect the initial sorting action by which those spouts, whose faces are disposed in the proper direction, drop between the studs 7 of the sorting wheel. This initial phase of sorting does not necessarily effect the proper positioning of the extending lip portions of the pouring spouts. As the spouts drop between the studs of the sorting wheel, the body portions thereof abut the inner edge portion of the cover plate 31 and the spouts then tend to gravitate towards the orienting wheel 13 and the discharge chute. As the spouts slide down the cover plate, they become engaged by the rubber annulus 14 of the wheel 13. This engagement advances the spouts into the discharge chute 8. Since the distance between the periphery of the wheel and the opposite wall portion of the discharge chute is less than the diameter of the body portion of the spouts, the wheel will be bodily displaced to permit and effect passage of the spouts. Since the wheel is urged against the spouts by action of the tension spring 27, the spouts in turn will press against the wall portion 34 of the discharge chute. Thus, the wall portion 34 of the chute serves as a rolling fulcrum for rotation of the spouts during advance and under the influence of the rubber annulus 14 of the wheel. If a spout approaches the rotating wheel 13 in the position indicated at A in Fig. 5, it will be observed that the downwardly extending lip portion will be preceded into the discharge chute by the body portion of the spout. Thus, the action of the wheel 13 in advancing the pouring spout into the discharge chute will not effect any rotation of the spout since both the body portion of the spout and an edge of the extending lip thereof will be in contact with the annulus 14 of the wheel which, obviously, effectively bars rotation of the spout. Therefore, the spout will be advanced into the discharge chute with the body portion foremost and the lip portion extending upwardly. In the event that a pouring spout should approach the wheel 13 and the discharge chute in the position indicated at B of Fig. 5, the body portion of the spout will first become engaged with the rubber annulus of the wheel. As pointed out above, advance of the spout under the influence of the wheel will effect a partial rotation thereof between the wheel and the side wall portion 34 of the discharge chute as indicated at C. It should be noted that the extending lip portion of the pouring spout is received into the slot 38 of the discharge chute side wall and thus, clearance is provided to permit reception of improperly oriented spouts into the discharge chute prior to or during actual orientation of the spouts. This rotation of the spout will properly position the spout so that its body portion enters the discharge chute ahead of the extending lip portion. Thus, pouring spouts which approach the discharge chute from positions indicated at B will also be properly oriented prior to actual discharge from the machine. In the event that a pouring spout approaches the discharge chute with its lip portion extending forwardly along the axis of the path of travel through the chute, the body portion of the spout will be engaged between the rubber annulus of the wheel and the side wall portion 34 as described above. It is quite possible that when the spout approaches the discharge chute in this manner, full rotation of the spout to a properly oriented position will not be completely effected by the time the spout has reached the lower end 36 of the lip receiving slot 38 in the chute. Whenever this occurs, the body portion of the spout is still engaged between the wheel and the opposed wall of the chute and the advance of the body portion under the influence of the wheel will cause the edge portion of the extending spout lip to fulcrum about the end wall 36 of the slot 38 to thereby result in the proper orientation of the spout. Thus, it will be observed that regardless of the initial position or initial alignment of the extending lip portions of the pouring spouts as they drop between the studs of the sorting wheel, they will be passed through the discharge chute in a uniformly oriented manner.

While a sorting machine constructed in accordance with this invention is particularly adapted to be employed in connection with the sorting and orienting of pouring spouts with radially extending lip portions, it is, of course, entirely possible to employ the machine in connection with the sorting of normally shaped closure caps or the like. Whenever the machine is employed in connection with normally shaped caps, it will be readily apparent that the rotation of such caps when engaged between the wheel 13 and the opposed wall portion of the discharge chute will not effect the proper alignment of the caps and in such case, the wheel 13 serves merely as a positive feeding means effective to convey the caps from the hopper to the vertical portion of the discharge chute.

It is of course to be understood that certain details of arrangement and proportions of parts may be variously modified without exceeding the scope of the appended claims.

I claim:

1. In a machine for sorting articles having radially projecting lip portions, a chute adapted to receive said articles, a rotatable wheel, stationary means spaced from said wheel and defining therewith a passageway to said chute, means for yieldably urging said rotatable wheel toward said stationary means whereby to yieldably engage said articles between said rotatable wheel and said stationary means, and means to rotate said rotatable wheel for individually urging each of said articles into a predetermined position with the projecting lip portions thereof uniformly oriented and for individually and successively delivering said oriented articles to said chute.

2. In a machine for sorting articles having radially projecting lip portions, a chute adapted to receive said articles, a movable frictioning device, stationary means spaced from said frictioning device and defining therewith a passageway to said chute, means for yieldably urging said frictioning device toward said stationary means whereby to yieldably engage said articles between said frictioning device and said stationary means, and means to move said frictioning device for individually urging each of said articles into a predetermined position with the projecting lip portions thereof uniformly oriented and for individually and successively delivering said oriented articles to said chute.

3. In a machine for sorting articles having radially projecting lip portions, a movable frictioning device, stationary means spaced from said frictioning device and defining therewith a passageway, means for successively delivering said articles to said passageway, means for yieldably urging said frictioning device toward said stationary means whereby to yieldably engage each of said articles between said frictioning device and said stationary means as said articles progress through said passageway, and means to move said frictioning device for individually urging each of said articles to rotate into a predetermined position with the projecting lip portions thereof uniformly oriented and for individually and successively discharging said oriented articles from said passageway.

4. In a machine for sorting articles having radially projecting lip portions, a chute adapted to receive said articles, said chute being so constructed and arranged as to maintain longitudinally thereof the lip portions of articles positioned therein; and means for yieldably urging said articles prior to entry into said chute to rotate in a predetermined direction tending to bring the lip portions of said articles into uniform orientation with the longitudinal axis of said chute, said last named means including a rotatable wheel, means spaced from said wheel defining with said wheel a passageway to said chute, means for yieldably urging said wheel into engagement with each of said articles introduced to said passageway, and means for rotating said wheel at such a speed as to insure rotation of each of said articles while in said passageway to an extent sufficient to bring the lip portions thereof to a position such that upon entry into said chute the lip portions of all of said articles will extend in the same direction relative to the axis of said chute.

5. In a machine for sorting articles having generally cylindrical bodies and eccentrically positioned radially projecting portions, a chute adapted to receive said articles, said chute being so constructed and arranged as to maintain longitudinally thereof the projecting portions of articles positioned therein; and means for individually and successively delivering said articles to said chute and for yieldably urging said articles prior to entry into said chute to rotate in a predetermined direction tending to bring the projecting portions of said articles into uniform orientation with the longitudinal axis of said chute, said last named means including a rotatable wheel, means spaced from said wheel defining with said wheel a passageway to said chute, means for yieldably urging said wheel into engagement with each of said articles introduced into said passageway, and means for rotating said wheel in such direction and at such speed as to rotate at least some of said articles in said passageway to an extent sufficient to bring the projecting portions thereof into abutment with said rotatable wheel whereupon further rotation of said articles will be prevented and to insure rotation of all of said articles to an extent at least sufficient to bring the projecting portions thereof to positions such that upon entry into said chute the orientation of all said articles will be uniform.

6. In a machine for sorting articles having radially projecting lip portions, a chute adapted to receive said articles, said chute being so constructed and arranged as to maintain longitudinally thereof the lip portions of articles positioned therein; and means for yieldably urging said articles prior to entry into said chute to rotate in a predetermined direction tending to bring the lip portions of said articles into uniform orientation with the longitudinal axis of said chute, said last named means including a movable frictioning device, means spaced from said frictioning device defining with said frictioning device a passageway to said chute, means for yieldably urging said frictioning device into engagement with each of said articles introduced to said passageway, and means for moving said frictioning device while in engagement with articles in said passageway in such manner as to rotate each of said articles to an extent sufficient to bring the lip portions thereof to a position such that upon entry into said chute the lip portions of all of said articles will extend in the same direction relative to the axis of said chute.

HOWARD E. GANTZER.